United States Patent
Dry

(10) Patent No.: US 9,937,836 B2
(45) Date of Patent: Apr. 10, 2018

(54) SEATBACK WITH COLLAPSIBLE INTERNAL SUPPORT UNIT

(71) Applicant: Ford Global Technologies, LLC, Dearborn, MI (US)

(72) Inventor: Alan George Dry, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 14/623,962

(22) Filed: Feb. 17, 2015

(65) Prior Publication Data
US 2016/0236601 A1 Aug. 18, 2016

(51) Int. Cl.
| | |
|---|---|
| *B60N 2/68* | (2006.01) |
| *B60N 2/64* | (2006.01) |
| *B60N 2/20* | (2006.01) |
| *B60N 2/44* | (2006.01) |
| *B60N 2/66* | (2006.01) |

(52) U.S. Cl.
CPC .............. *B60N 2/68* (2013.01); *B60N 2/20* (2013.01); *B60N 2/206* (2013.01); *B60N 2/4415* (2013.01); *B60N 2/64* (2013.01); *B60N 2/643* (2013.01); *B60N 2/6671* (2015.04)

(58) Field of Classification Search
CPC . B60N 2/643; B60N 2/68; B60N 2/64; B60N 2/22; B60N 2/20; B60N 2/6671; B60N 2/206; B60N 2/4415

USPC ......... 297/284.1, 284.6, 378.1, 284.2, 284.3, 297/284.7, 378.12, 284.8
See application file for complete search history.

(56) References Cited

U.S. PATENT DOCUMENTS

| | | | |
|---|---|---|---|
| 878,889 A * | 2/1908 | Miller .................... | A47C 1/16 297/292 |
| 3,730,588 A | 5/1973 | Braun | |
| 4,018,477 A | 4/1977 | Hogan | |
| 4,316,631 A | 2/1982 | Lenz et al. | |
| 4,536,030 A | 8/1985 | Sakurada et al. | |
| 4,629,248 A | 12/1986 | Mawbey | |
| 4,909,568 A | 3/1990 | Dal Monte | |
| 6,036,265 A | 3/2000 | Cosentino | |
| 6,386,633 B1 | 5/2002 | Newton | |
| 6,450,579 B1 | 9/2002 | Nylander et al. | |
| 6,554,360 B1 | 4/2003 | Wilke et al. | |
| 6,623,076 B2 | 9/2003 | Klingler | |
| 6,905,170 B2 | 6/2005 | McMillen et al. | |
| 7,086,700 B2 * | 8/2006 | Habedank ............. | B60N 2/449 297/284.4 |
| 7,108,323 B2 | 9/2006 | Welch et al. | |
| 7,255,399 B2 | 8/2007 | White et al. | |
| 7,311,358 B2 | 12/2007 | White et al. | |
| 7,490,900 B2 | 2/2009 | Szczudrawa | |
| 7,874,618 B2 | 1/2011 | Kohl et al. | |

(Continued)

*Primary Examiner* — Milton Nelson, Jr.
(74) *Attorney, Agent, or Firm* — Vichit Chea; Price Heneveld LLP

(57) ABSTRACT

A vehicle seat includes a cushion and a seatback rotatably coupled with the cushion, the seatback defining a height. The seatback further has an internal support unit with a connecting member extending through a portion of the height and a plurality of flexible ribs extending from the connecting member to ends fixed with the seatback. A link couples the connecting member with the cushion to move the connecting member along the height by rotation of the seatback.

20 Claims, 6 Drawing Sheets

(56) References Cited

U.S. PATENT DOCUMENTS

| | | | |
|---|---|---|---|
| 8,235,466 B2* | 8/2012 | Yamada | B60N 2/3011 |
| | | | 297/284.1 |
| 2006/0061183 A1 | 3/2006 | White et al. | |
| 2007/0158985 A1* | 7/2007 | Mundell | B60N 2/206 |
| | | | 297/284.2 |
| 2010/0117420 A1* | 5/2010 | Frotz | B60N 2/20 |
| | | | 297/284.1 |

* cited by examiner

SEATBACK WITH COLLAPSIBLE INTERNAL SUPPORT UNIT

FIELD OF THE INVENTION

The present invention generally relates to a vehicle seatback having a collapsible portion to facilitate folding of the seat. The collapsible portions can be moved from an expanded position to a collapsed position by a link between the collapsible portion and a seat cushion.

BACKGROUND OF THE INVENTION

Vehicles may include foldable seats in which a seatback thereof can be rotated in a downward direction into contact with a corresponding cushion. Folding seats can be used in connection with, for example, the rear seats of a vehicle such that the seatbacks thereof can be folded, when not occupied by a passenger or the like, to expand the cargo area provided by the trunk of the vehicle. Accordingly, the degree to which the seatback can be folded impacts the useable cargo area achieved by such folding. Due to ergonomic and other concerns, seatbacks and cushions may have contours and thicknesses that limit the folding of the seatback such that a rear surface of the seatback, on which cargo is supported, is angled significantly upward from the adjacent trunk surface. This can impact both the useable cargo space, as well as the ability to reliably place objects on the sloped surface. Accordingly, improvements to vehicle seats are desired that allow for a greater degree of folding.

SUMMARY OF THE INVENTION

According to one aspect of the present invention, a vehicle seat includes a cushion and a seatback rotatably coupled with the cushion, the seatback defining a height. The seatback further has an internal support unit with a connecting member extending through a portion of the height and a plurality of flexible ribs extending from the connecting member to ends fixed with the seatback. A link couples the connecting member with the cushion to move the connecting member along the height by rotation of the seatback.

According to another aspect of the present invention, a seatback for a vehicle seat includes a frame and a coverstock defining a seat surface. The seatback also includes a unitary, flexible internal support unit positioned between the frame and the coverstock. The support unit is moveable between an expanded configuration, in which the seating surface is supported over the frame at a first distance, and a collapsed configuration, in which the seating surface is supported over the frame at a second distance that is less than the first distance.

According to another aspect of the present invention, a vehicle seat includes a cushion and a seatback coupled with the cushion and rotatable between an open position and a folded position. The seatback includes a unitary, flexible internal support unit therein having a frame and a plurality of flexible ribs joined by a central connecting member. A linking cable couples the connecting member with the cushion to move the connecting member within the frame by rotation of the seatback.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
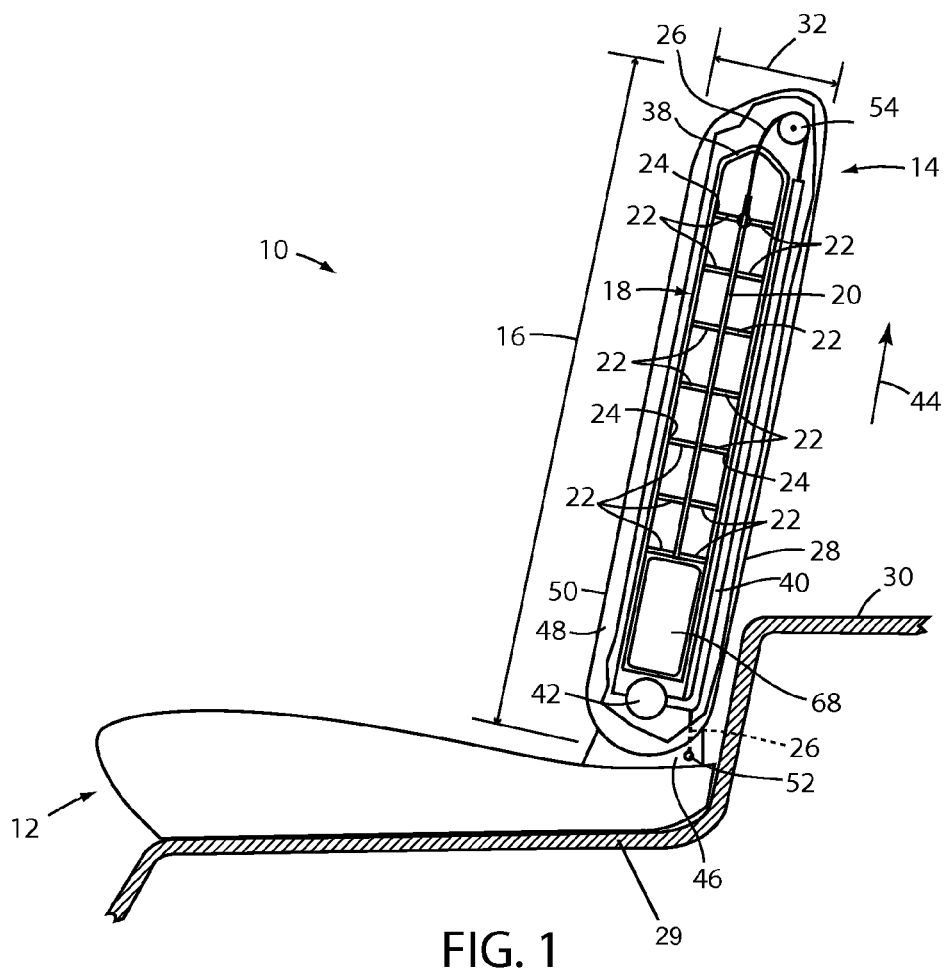
FIG. 1 is a side elevation view of a vehicle seat with a portion thereof cutaway to show an internal support included therein.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Figure 2:
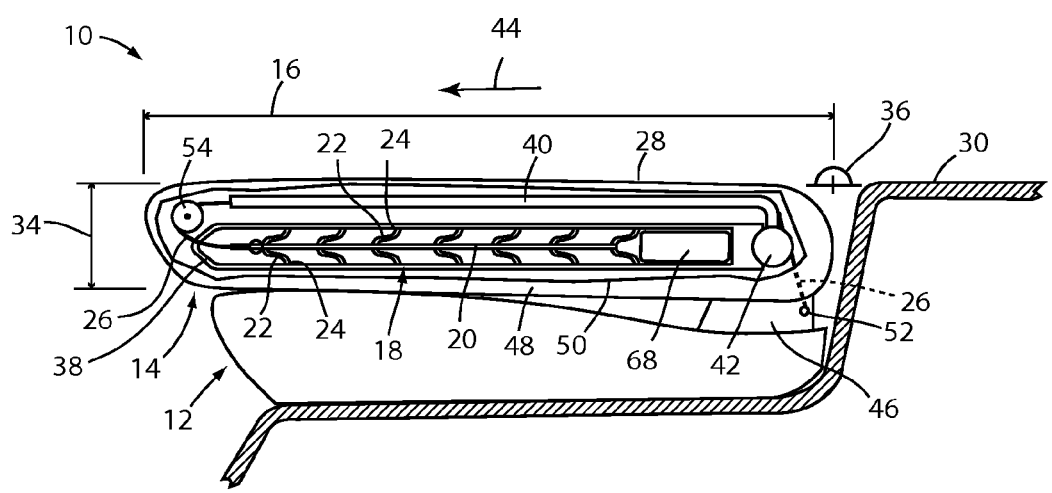
FIG. 2 is a side elevation view of the vehicle seat of FIG. 1 in a second configuration that includes the internal support in a collapsed position.

Referring to FIGS. 1 and 2, reference numeral 10 generally designates a vehicle seat. Vehicle seat 10 includes a cushion 12 and a seatback 14 rotatably coupled with the cushion. Seatback 14 has a height 16 and includes an internal support unit 18 having a connecting member 20 extending through a portion of the height 16 and a plurality of flexible ribs 22 extending from connecting member 20 to respective ends 24 fixed with the seatback 14. Seatback 14 further includes a link, shown in the form of a linking cable 26, coupling the connecting member 20 with respect to the cushion 12 to move the connecting member 20 along the height 16 of the seatback 14 by rotation of seatback 14. More particularly, linking cable 26 may be coupled with hinge support bracket 46, which itself may be coupled with floor 29 of the associated vehicle, with which cushion 12 is also coupled. In this manner, linking cable 26 may be considered as coupling connecting member 20 with cushion 12.

As shown in FIGS. 1 and 2, seatback 14 is rotatably coupled with respect to cushion 12 such that seatback 14 can be rotated between an open position, as shown in FIG. 1, and a folded position, as shown in FIG. 2. In particular, the open position (FIG. 1) is such that an occupant may be suitably seated in vehicle seat 10, in a position wherein the occupant is seated on cushion 12 with the occupant's back resting on seatback 14. The folded position (FIG. 2) may be used to expand a cargo area of an associated vehicle, such as by allowing for storage of cargo on back surface 28 of seatback 14. As such, seat 10 can be usable as a rear seat within the associated vehicle and may be positioned such that, when in the folded position (FIG. 2), the back surface 28 of seatback 14 is generally aligned with a trunk floor 30 that is associated with the rear cargo area of the respective vehicle. As such, and as described further below, the coupling of connecting member 20 with cushion 12 is such that rotation of seatback 14 between the open position (FIG. 1) and the closed position (FIG. 2) causes movement of connecting member 20 with respect to the ends 24 of ribs 22, thereby deforming ribs 22 and, accordingly, the entirety of support unit 18 into a collapsed position that corresponds to the folded position of seatback 14.

The deformation of support unit 18 into the collapsed position, thusly, allows for a decrease in the thickness of the seatback between an expanded thickness 32 (FIG. 1) and a collapsed thickness 34 (FIG. 2), which allows for seatback 14 to provide a generally more compact arrangement when seatback 14 is in the folded position, thereby allowing back surface 28 thereof to be positioned at an angle 36 that is less than what would otherwise be achievable during folding of seatback 14. In one embodiment, the decrease in thickness of seatback 14 from the expanded thickness 32 to the collapsed thickness 34 is such that angle 36 is 6° or less, and in a further embodiment, about 4° or less.

In a similar manner, the above-mentioned linking of connecting member 20 in a fixed position with respect to cushion 12 by link cable 26 (e.g. to hinge support 46), for example, is such that support unit 18 is in a generally expanded position when seatback 14 is in the open configuration (FIG. 1). This arrangement can allow for seatback 14 to provide generally acceptable levels of comfort and support for the back of an occupant when seated therein. In this manner, support unit 18 may be of a generally resiliently deformable material, including various types of plastic or the like, such that the cellular structure provided by the relative positioning of the connecting member 20, ribs 22, and the outer frame 38, to which ends 24 of ribs 22 are coupled in the example shown, can provide a compliant, supportive structure suitable to replace portions of foam or other spring-based structures typically found in vehicle seatbacks.

As further shown in FIGS. 1 and 2, seatback 14 can include a supporting frame 40, to which support unit 18 may be coupled. Seatback frame 40 can be of metal or another suitably rigid material such that seatback frame 40 can provide structural support for the remaining portions of seatback 14. Further, seatback frame 40 can be rotatably coupled with cushion 12 about a hinge 42 to provide the rotatable coupling of seatback 14 with cushion 12. Seatback frame 40 can further provide routing or guidance for cable 26 so as to extend internally within seatback 14. Further, seatback 14 can include a coverstock 48 that can include a fabric outer layer over a compliant inner layer of foam or another similar material. Coverstock 48 can generally cover visible outer portions of seatback 14 and can define a seating surface 50 opposite back surface 28. As such, at least the portions of coverstock 48 defining seating surface 50 can be supported over seatback frame 40 by one or more support units 18, as shown in FIGS. 1 and 2. Accordingly, the expansion and contraction of support unit 18, as described above and described further below, is such that seating surface 50 is supported over frame 40 at a greater distance when seatback 14 is in the open position than in the closed position.

As mentioned above, and as shown in FIGS. 1 and 2, link cable 26 can be routed through a portion of seatback frame 40. Further, link cable 26 can be coupled at one end, with hinge support 46 and at another end thereof with an upper most portion of connecting member 20. The routing of link cable 26 through seatback 14, including through seatback frame 40 can be such that link cable 26 pulls on connecting member 20 in a generally upward direction 44 with respect to seatback 14. It is noted that the upward direction 44 referenced herein is with respect to seatback 14 regardless of the rotational orientation thereof with respect to cushion 12, and may not be upward in an absolute sense. In the particular arrangement shown, anchor point 52 of link cable 26 is disposed toward a rear portion of hinge support 46 such that link cable 26 extends upward behind hinge 42, which may extend laterally (i.e. in and out of the page with respect to FIGS. 1 and 2) across seatback 14. Link cable 26 continues upwardly through seatback 14, including through seatback frame 40, which may include appropriate holes and or tubes for such routing. Along and upper portion of seatback 14, link cable 26 emerges from seatback frame 40 and is directed over roller 54 such that cable 26 may extend downwardly to couple with connecting member 20. In this manner, the distance over which cable 26 is routed through seatback 14 becomes longer as seatback 14 is rotated from the open position to the folded position, such that cable 26 pulls upwardly on connecting member 20 during such rotation, thereby deforming support unit 18 to the collapsed position. Space within seatback 14 not occupied by one or more support units 18 can be occupied by one or more foam inserts 68 that can provide a supportive force of coverstock 48 above seatback frame 40, while being compressible enough to accommodate movement of seatback 14 into the collapsed positioned, such as when seatback 14 is moved into the folded position (FIG. 2).

Figure 3:
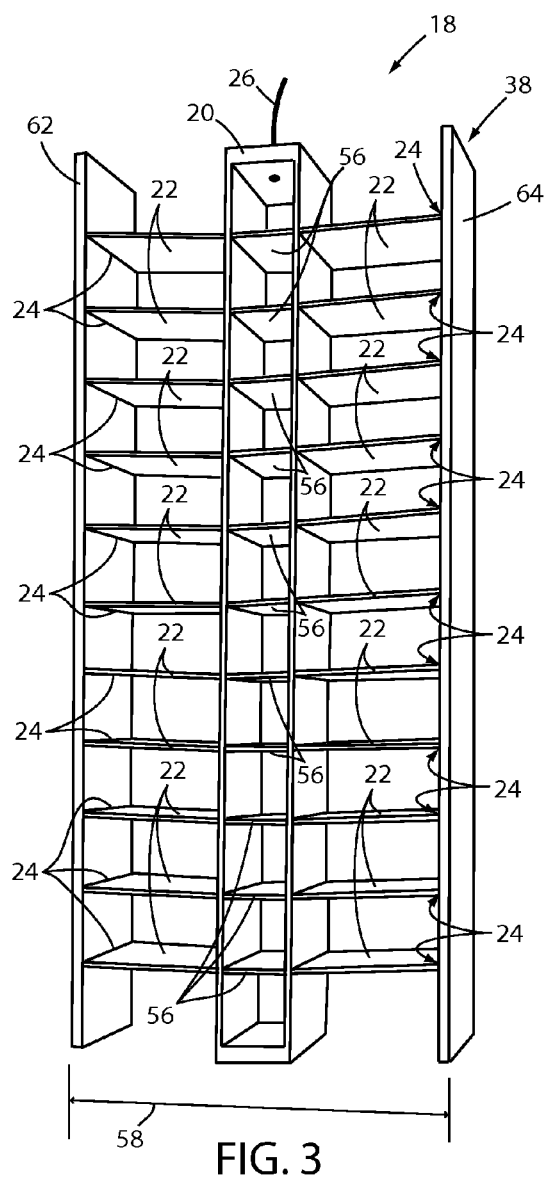
FIG. 3 is a front perspective view of an internal support unit useable in a vehicle seat.
Figure 4:
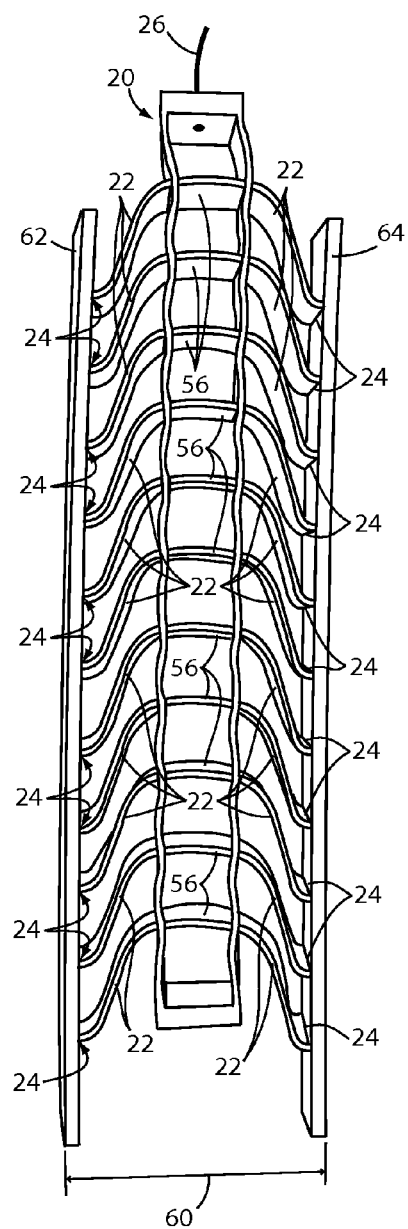
FIG. 4 is a front perspective view of the internal support unit of FIG. 3 in a collapsed position.

Turning now to FIGS. 3 and 4, an example of a structural unit 18 is further described. As shown, structural unit 18 is a generally unitary element that can be made, for example, by injection molding plastic into the shape shown, for example, in FIG. 3. As shown, connecting member 20 can be a generally open, rectangular unit that can include, for example, a plurality of intermediate ribs 56 therein that can give structural support to connecting member 20, particularly when under compression due to the weight of an occupant. As discussed previously, ribs 22 extend outward from connecting member 20 on both sides thereof and are joined with frame 38 of unit 18 on respective opposite sides of connecting member 20. In the example shown in FIG. 3, frame 38 is discontinuous and includes a seat side member 62 and a frame side member 64. However, as in the example shown in FIGS. 1 and 2 frame 38 can be a generally rectangular member in which seat side member 62 and frame side member 64 are connected by additional portions of frame 38. In an example, support unit 18 can be made of a generally resiliently deformable plastic material such as thermal plastic olefin ("TPO"), other materials being similarly suitable.

As shown in FIG. 4, when in the collapsed position, ribs 22 can deform between the points at which they are respectively coupled with connecting member 20 and corresponding portions of frame 38 (i.e. ends 24 thereof). As shown, ribs 22 may remain generally perpendicular to connecting member 20 and frame 38, respectively, at the points of coupling therebetween. Accordingly, the deformation of ribs 22 can include bending adjacent to connecting member 20 and frame 38 with intermediate portions thereof extending alongside connecting member 20 such that ends 24 of ribs 22 move closer to connecting member 20. As shown, this deformation includes movement of connecting member 20 in the upward direction 44 which as described above, can be induced by upward force of link cable 26 on connecting member 20, thereby causing deformation of ribs 22 into the illustrated bent position, as frame 38 remains generally stationary, at least with respect to side members 62 and 64 which are affixed, respectively with seatback frame 40 and coverstock 48, for example. As shown in FIGS. 3 and 4, such deformation of support units 18 can be such that the thickness thereof decreases from an expanded distance 58, as shown in FIG. 3, to a collapsed distance 60, as shown in FIG. 4. In an example, the collapsed distance 60 can be between about 10% and 50% less than the expanded distance 58, and in one embodiment about 25% less.

Although described above as being fixed with seatback frame 40 and coverstock 48, respectively, members 62 and 64 of frame 38 need not be actually coupled with thereto, but rather may be otherwise held in a general position that is fixed relative to seatback, to allow movement of connecting member 20 upwardly with respect to ends 24 of ribs 22 under tension from link cable 26. In an example, support unit 18 may be positioned against or between appropriately positioned elements respectively affixed with other portions of seatback, such as frame 38 or the like, examples of which are described further below.

Figure 5:
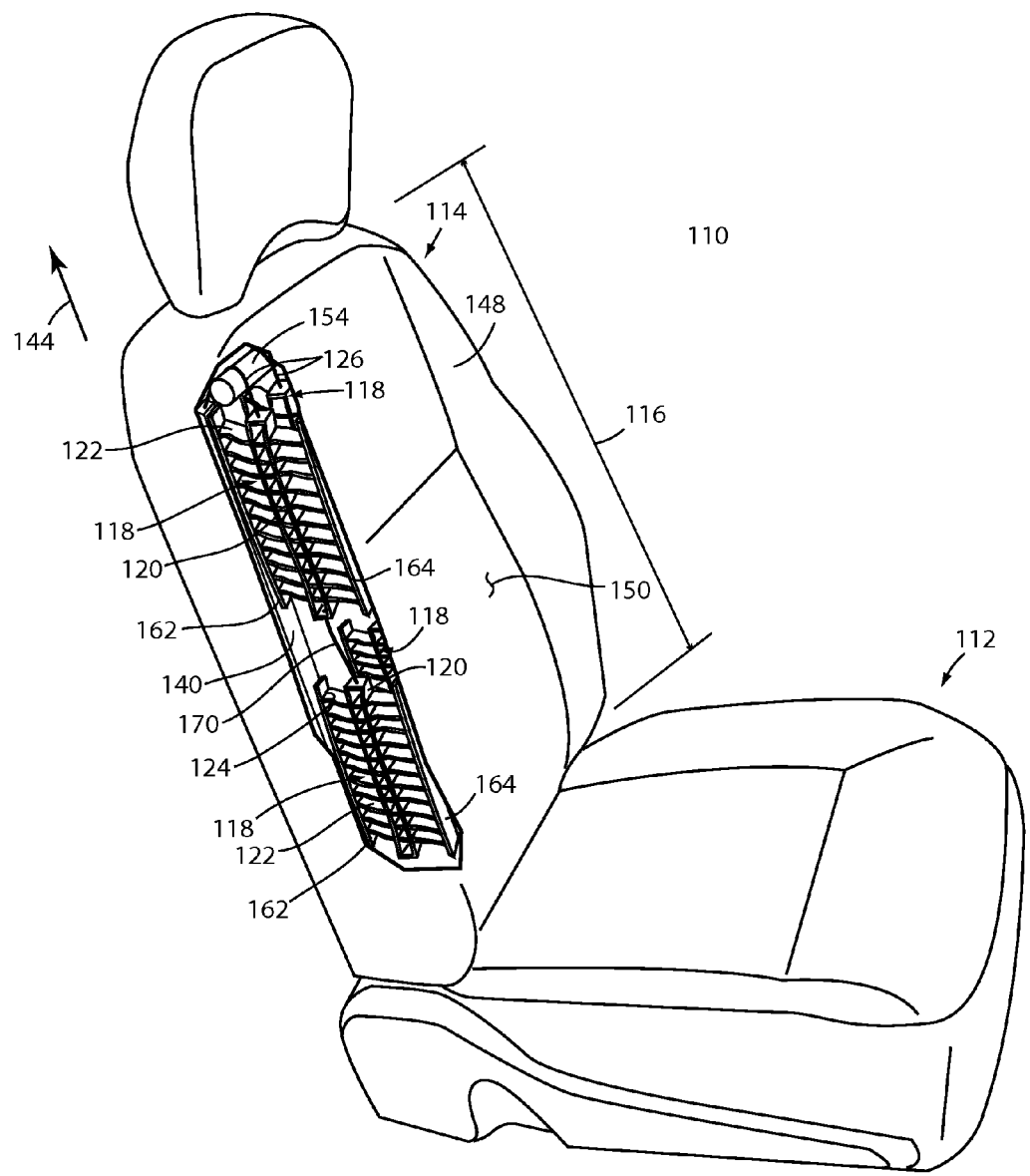
FIG. 5 is a front perspective view of an alternative vehicle seat with a portion thereof cutaway to show a plurality of internal support units therein.

Turning now to FIG. 5, an example of a vehicle seat 110 is shown having a plurality of separate support units 118 supporting seat surface 150 of coverstock 148 over seatback frame 140. As shown, the various separate support units 18 can be spaced apart both horizontally and vertically beneath coverstock 148, and can be positioned, as needed, to provide adequate support therefore given the compressibility of support units 18 and the necessary support for coverstock 148 in the area of seating surface 150. In the example shown, through the cut away in coverstock 48, two columns of two vertically arranged support units 118 are positioned within seatback 114. In this arrangement, additional rows (e.g. two rows) of similarly vertically spaced support units 118 can be further included within seatback 114. Other arrangements of multiple support units 118 are also possible.

As shown, a plurality of corresponding link cables 126 are routed through seatback 114, such as through seatback frame 140 in a similar manner to the routing of link cable 26 through seatback frame 40, described above with respect to FIGS. 1 and 2. In this manner, a number of link cables 126 corresponding to the number of columns of vertically arranged support units 118 can be separately coupled with cushion 112 so as to extend upwardly within seatback 114 and over upper roller 154 to, then, extend downwardly and couple with connecting members 120 of the upper most support units 118. In this manner, the upper support units 118 can be drawn into the collapsed position by upward movement of the respective connecting members 120, under tension from the respective link cables 126. A further plurality of intermediate links, which can also be in the form of cable segments 170 can connect between connecting members 120 of the upper most support units 118 and corresponding ends of connecting members 120 of the lowermost support units 118. As such, upward movement of connecting members 120 of the upper most support units 118 can further cause upward movement of the connecting members 120 of the lowermost support units 118. In examples where additionally vertically arranged support units 118 are included, further, intermediate links can also be included.

Figure 6:
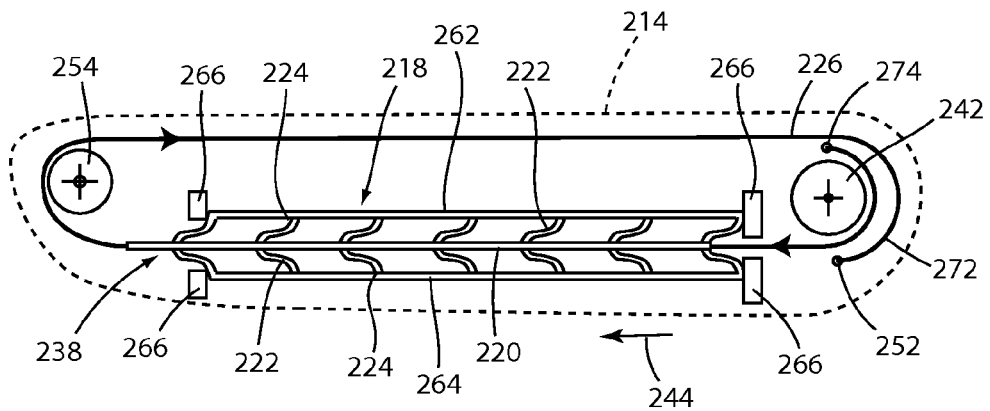
FIG. 6 is a side elevation view of a support unit in a collapsed position, along with related components, useable in a vehicle seatback.
Figure 7:
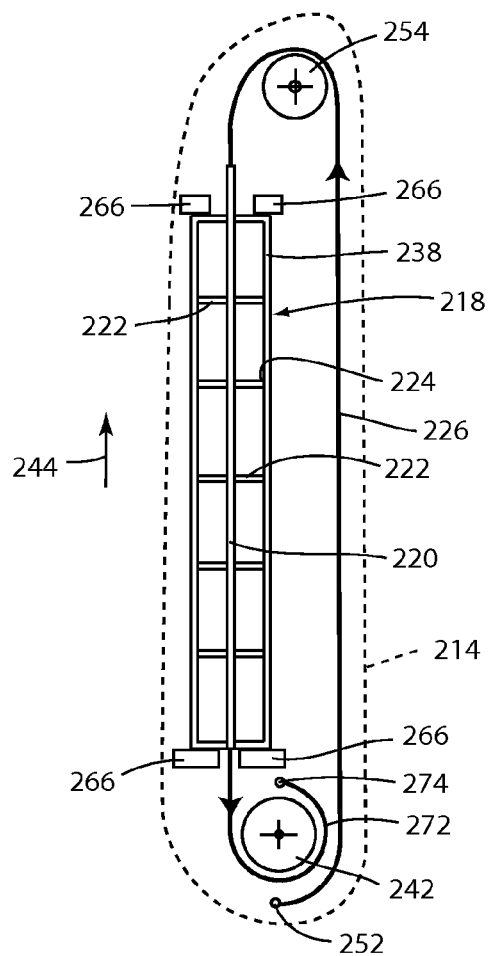
FIG. 7 is a side elevation view of the support unit and related components of FIG. 6 with the support unit in an expanded position.

Turning now to FIGS. 6 and 7, an arrangement for a support unit 218 that can be included within a seatback 214 is illustrated. In this example, support unit 218 can be generally held in position with respect to the corresponding seatback 214 by a plurality of blocks 266 that, respectively, abut the upper and lower ends of frame 238, at least in the areas of side members 262 and 264. Further, blocks 266 can be spaced apart from the arear of connecting member 220, such that connecting member 220 can be drawn in the upward direction 244 to move support unit 218 into the collapsed position, as shown in FIG. 7. As shown, a lower link cable 272 can further be affixed with connecting member 220 such that an additional force can be provided against support unit 218 for movement thereof from the collapsed position (FIG. 6) to the expanded position (FIG. 7).

As shown, upper link cable 126 can be configured in a manner generally similar to that which is described above with respect to FIGS. 1 and 2. Lower cable 272 can extend downwardly from connecting member 220 and around a front portion of hinge 242 (or another similar separate member within seatback 214) to a second anchor point 274 that is positioned opposite from anchor point 252 (i.e. on an upward side thereof). In this manner, the path of travel for lower cable 272 becomes longer as seatback 214 is moved from the folded configuration to the open configuration, thereby providing tension to act on connecting member 220 during such movement. Such an arrangement can be used to provide an additional expansion force for connecting member 220, which may be, as with the embodiment discussed above with respect to FIGS. 1 and 2, formed so as to have a natural position in the extended position. In such an example, such additional force may be helpful to overcome any material creep due to seatback 214 being in the folded position for an extended period of time. Still further, such an arrangement can be used in connection with an alternative embodiment of support unit 218 that is naturally in the compressed position, with the tension provided by lower cable 272 serving to urge support unit 218 into the expanded position.

Figure 8:
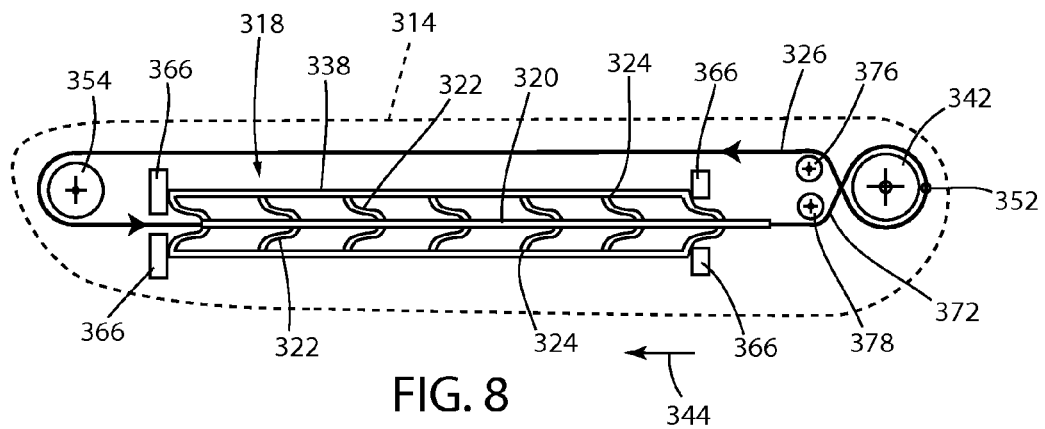
FIG. 8 is a side elevation view of an alternative support unit in a collapsed position, along with related components, useable in a vehicle seatback.
Figure 9:
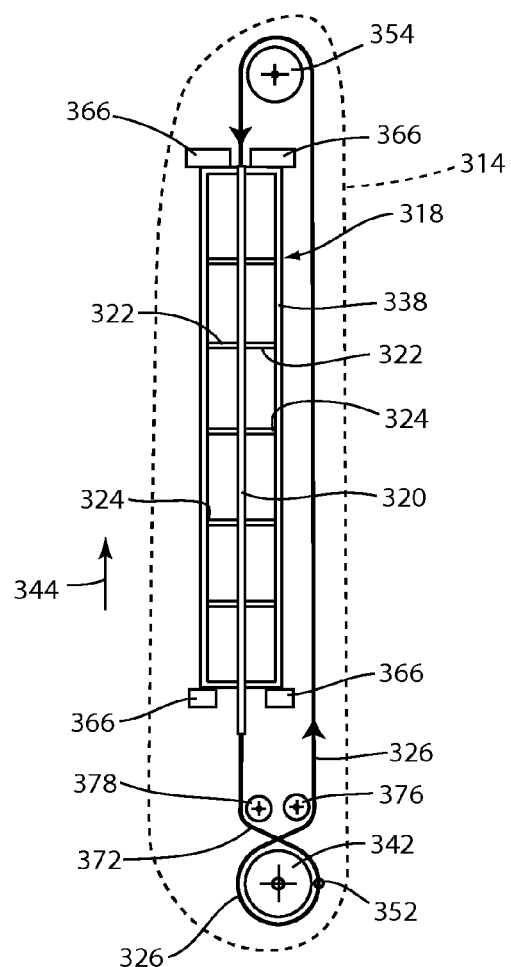
FIG. 9 is a side elevation view of the support unit and related components of FIG. 8 with the support unit in an expanded position.

FIGS. 8 and 9 show a further alternative arrangement for controlling expansion and collapsing of a support unit 318 within a seatback 314. In such an embodiment, upper link cable 326 and lower link cable 372 are provided, in a manner similar to those which are discussed above with respect to FIGS. 6 and 7. As shown, however, upper link cable 326 and lower link cable 372 are routed over separate, respective lower rollers 376 and 378 before being routed around hinge 342 and being coupled with respect to the cushion (not shown) at a common anchor point 352. As shown, cables 326 and 372 cross between the points at which they respectively extend over lower rollers 376 and 378 and which they loop over hinge 342. In this manner, the directions of seatback 314 movement that cause tension on the respective cables 326 and 372 are reversed with respect to directions described above with respect to FIGS. 1 and 2, as well as FIGS. 6 and 7. As such, movement of seatback 314 from the folded configuration (FIG. 8) to the open configuration (FIG. 9) causes tension on link cable 326, whereas movement in the opposite direction causes tension on lower cable 372.

In the arrangement of FIGS. 8 and 9, collapsing of support unit 318 is accomplished under the tension provided by cable 372 in movement from the open configuration to the folded configuration, thereby causing movement of connecting member 320 in the downward direction. Such an arrangement can be useful depending on the particular fit of support units 318 within seatback 314, particularly in the ability to accommodate movement of connecting member 320. Further, such an arrangement can be utilized in connection with a support unit 318 that is naturally in either of the expanded position or the contracted position.

Figure 10:
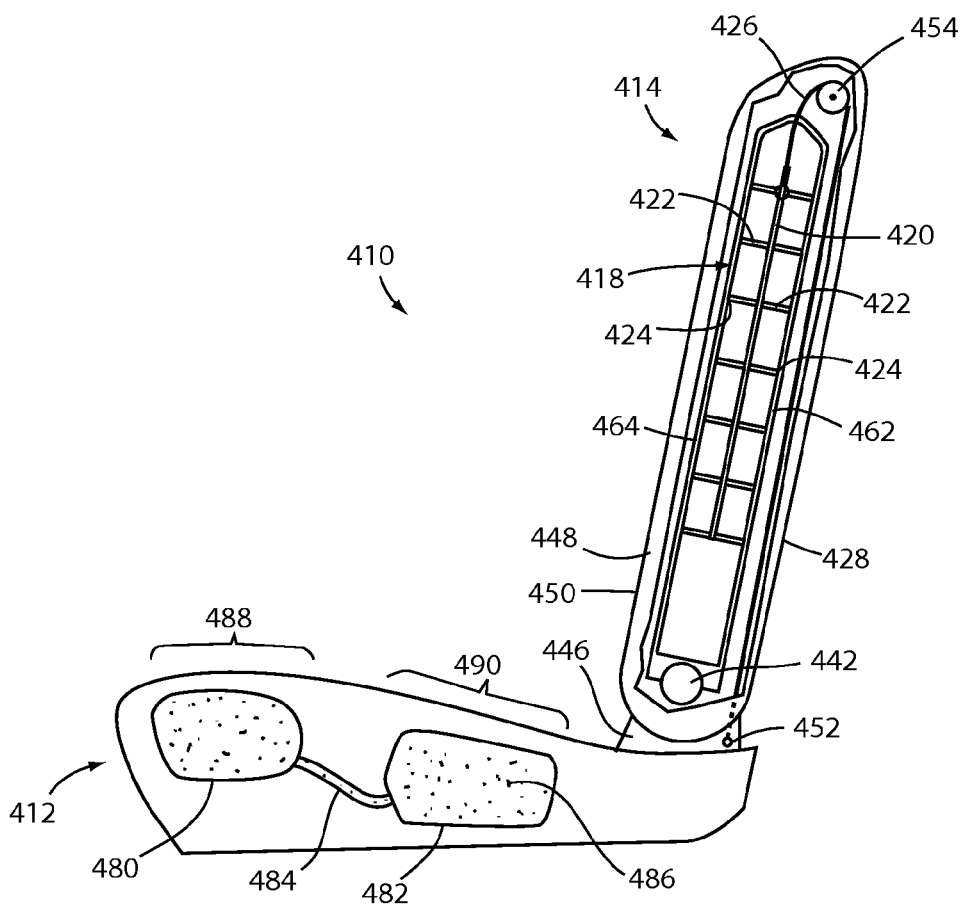
FIG. 10 is a side elevation view of a vehicle seat with a portion of a seatback thereof cutaway to show an internal support included therein, and a portion of the cushion cutaway to show a collapsible bladder system therein.
Figure 11:
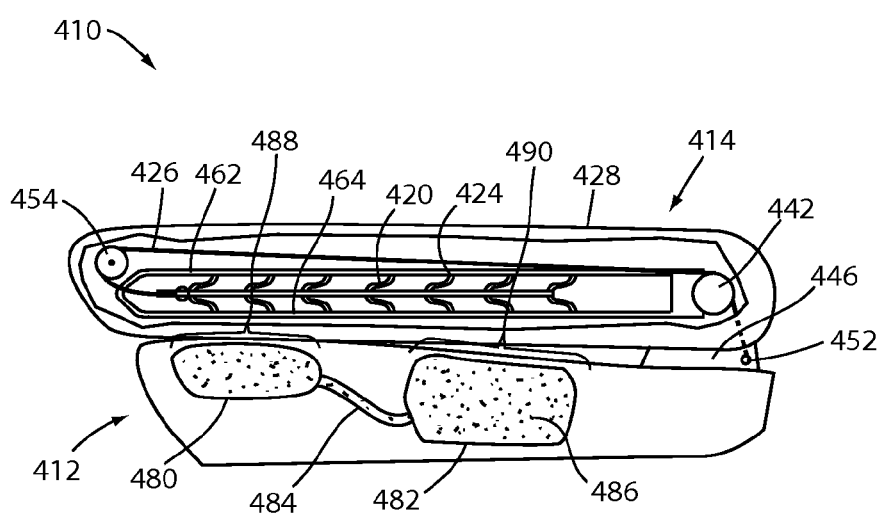
FIG. 11 is a side elevation view of the vehicle seat of FIG. 10 in a folded configuration.

Turning now to FIGS. 10 and 11, a further embodiment of a seatback 414 is shown in which seatback 414 includes a support unit 418 that is expandable and collapsible via a link cable 426, in a manner similar to that which is described above with respect to FIGS. 1 and 2. In the embodiment shown, cushion 412 is shown as having expandable and collapsible bladders therein in the form of an edge bladder 480 and an inflation bladder 482, edge bladder 480 and inflation bladder 482 being connected by a tube 484 such that the edge bladder 480 and the inflation bladder 482 are in fluidic communication. A fixed quantity of a flowable medium 486 is contained within inflation bladder 482, edge bladder 480 and tube 484 and at least a portion thereof is partially transferable between edge bladder 480 and inflation bladder 482. As shown, edge bladder 480 is positioned beneath a compressible edge region 488 of cushion 412 and inflation bladder 482 is positioned beneath a flexible central region 490 of cushion 412.

This arrangement allows for a portion of the fixed quantity of the flowable medium 486 to transfer from edge bladder 480 to inflation bladder 482 under a pressure applied to edge region 488 in the absence of an equal or great pressure within central region 490. In particular, this allows for edge region 488 to be compressed by seatback 414 when an unoccupied seat 410 is moved into the folded configuration (FIG. 11) by transfer of a portion of flowable medium 486 to inflation bladder 482. Additionally, when seat 410 is in the open configuration (FIG. 10) and is occupied by an occupant, the weight of the occupant on central region 490 can cause a portion of the flowable medium 486 to transfer from inflation bladder 482 to edge bladder 480 to provide support for edge region 488. Such an arrangement is further described in co-pending U.S. patent Nos. 9,527,417 and 9,550,439, and the disclosures of which are hereby incorporated by reference in their entirety. This arrangement can allow for further compact folding of seat 410.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A vehicle seat, comprising:
   a cushion; and
   a seatback rotatably coupled with the cushion, having a height, a front surface, and a rear surface, and including:
      an internal support unit having a connecting member defining a first side disposed toward the front surface and a second side disposed toward the rear surface and extending through a portion of the height and a plurality of pairs of flexible ribs extending from both the first and second sides of the connecting member to ends respectively fixed with portions of the seatback on opposite sides of the connecting member; and
      a link coupling the connecting member with the cushion to move the connecting member along the height by rotation of the seatback.

2. The vehicle seat of claim 1, wherein the link is a cable routed through a portion of the seatback.

3. The vehicle seat of claim 1, wherein:
   the seatback further includes a plurality of internal support units, each having a connecting member extending through a portion of the height and a plurality of flexible ribs extending from the connecting member to ends fixed with the seatback; and the link couples the connecting member of each of the plurality of internal support units with the cushion to move the connecting member along the height by rotation of the seatback.

4. The vehicle seat of claim 1, wherein movement of the connecting member along the height by rotation of the seatback is relative to the ends of the ribs by the ends being fixed with the seatback.

5. The vehicle seat of claim 1, wherein:
the seatback further includes a frame and a coverstock, the coverstock defining a seat surface that includes the front surface and the rear surface; and
the internal support unit is positioned between the frame and the coverstock to support the coverstock over the frame.

6. The vehicle seat of claim 5, wherein the internal support unit is moveable between an expanded position in which the ribs are in an extended position relative to the connecting member and a collapsed position in which the ribs are in a bent position relative to the connecting member.

7. The vehicle seat of claim 6, wherein when in the expanded position, the internal support unit supports the front surface away from the rear surface at a first distance and, when in the collapsed position, the internal support unit supports the first surface away from the second surface at a second distance that is at least 25% less than the first distance.

8. The vehicle seat of claim 6, wherein the link couples the connecting member with the cushion to move the connecting member along the height by rotation of the seatback such that the seatback is moveable between an open configuration and a folded configuration, movement of the seatback from the open configuration to the folded configuration causing the internal support unit to change from the expanded position to the collapsed position by movement of the connecting member.

9. The vehicle seat of claim 1, wherein the cushion defines a flexible central region and a compressible edge region and includes:
a compressible edge bladder within the edge region and a compressible inflation bladder within the central region and in fluidic communication with the edge bladder; and
a fixed quantity of a flowable medium contained in and partially transferable between the edge bladder and the inflation bladder.

10. The vehicle seat of claim 9, wherein:
the seatback is moveable by the rotatable coupling thereof with the cushion between an open position and a folded position, the seatback being positioned away from the edge region when the seatback is in the open position, and the seatback being in contact with the edge region of the cushion when the seatback is in the folded position; and
when in the folded position, the contact between the edge region and the seatback compresses the edge bladder, thereby transferring a portion of the fixed quantity of the flowable medium from the edge bladder to the inflation bladder.

11. A vehicle seat, comprising:
a cushion;
a seatback rotatably coupled with the cushion and including an internal support unit having a frame, a connecting member extending vertically within the frame, and a plurality of flexible ribs, each extending between opposite front and back sides of the frame through the connecting member; and
a linking cable coupling the connecting member with the cushion to move the connecting member within the frame by rotation of the seatback.

12. The vehicle seat of claim 11, wherein the internal support unit is configurable between an expanded position and a collapsed position, the expanded position being such that the flexible ribs extend generally perpendicular to and outward from the connecting member, and the collapsed position being such that the flexible ribs are bent to extend along the connecting member, respective ends of the flexible ribs being closer to the connecting member in the collapsed position than in the expanded position.

13. The vehicle seat of claim 12, wherein, when in the expanded configuration, the support unit is compressible in a direction along the thickness of the seatback.

14. The vehicle seat of claim 12, wherein:
the movement of the connecting member is between a first position, in which the support unit is in the expanded position, and a second position, in which the support unit is in the collapsed position; and
the seatback is rotatable between an open configuration and a folded configuration, the open position corresponding to the first position of the connecting member and the folded position corresponding to the second position of the connecting member by the coupling of the cushion and the connecting member by the linking cable.

15. The vehicle seat of claim 12, wherein:
the seatback is rotatable between an open configuration and a folded configuration; and
the internal support unit is moveable into the collapsed position under tension of the linking cable applied by movement of the seatback from the open configuration into the folded configuration.

16. The vehicle seat of claim 12, wherein:
the seatback is rotatable between an open configuration and a folded configuration; and
the internal support unit is moveable into the expanded position under tension of the linking cable applied by movement of the seatback from the folded position into the open position.

17. A vehicle seat, comprising:
a cushion;
a seatback coupled with the cushion and rotatable between an open position and a folded position, and including a unitary, flexible internal support unit therein having a frame and a plurality of flexible ribs joined by a connecting member centrally disposed within the frame; and
a linking cable coupling the connecting member with the cushion to move the connecting member within the frame by rotation of the seatback;
wherein the internal support unit is configurable between an expanded position and a collapsed position, the expanded position being such that the flexible ribs extend generally perpendicular to and outward from the connecting member, and the collapsed position being such that the flexible ribs are bent to extend along the connecting member, respective ends of the flexible ribs being closer to the connecting member in the collapsed position than in the expanded position.

18. The vehicle seat of claim 17, wherein:
the movement of the connecting member is between a first position, in which the support unit is in the expanded position, and a second position, in which the support unit is in the collapsed position; and the seatback is rotatable between an open configuration and a folded configuration, the open position corresponding to the first position of the connecting member and the folded position corresponding to the second position of the connecting member by the coupling of the cushion and the connecting member by the linking cable.

19. The vehicle seat of claim 17, wherein the internal support unit is moveable into the collapsed position under tension of the linking cable applied by movement of the seatback from the open position into the folded position.

20. The vehicle seat of claim 17, wherein the internal support unit is moveable into the expanded position under tension of the linking cable applied by movement of the seatback from the folded position into the open position.

* * * * *